No. 873,453. PATENTED DEC. 10, 1907.
J. M. NOLAN.
FOLDING SEAT FRAME FOR AUTOMOBILES.
APPLICATION FILED AUG. 23, 1907.
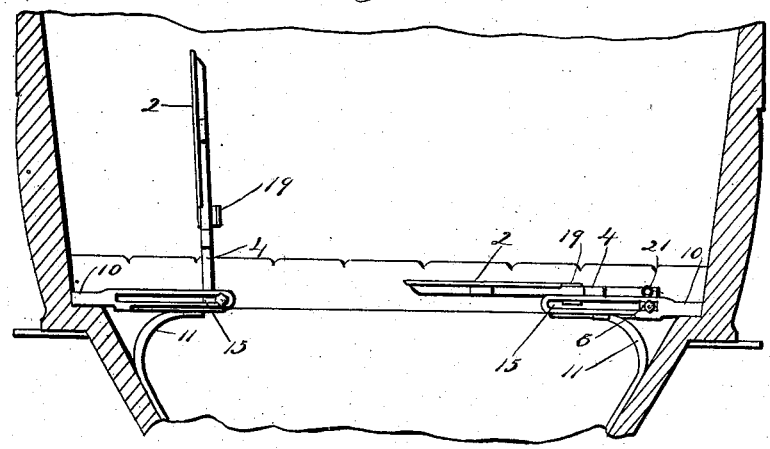
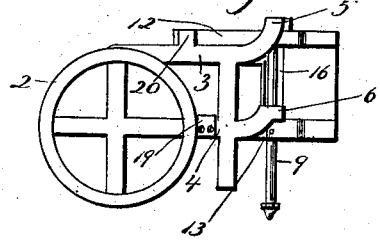 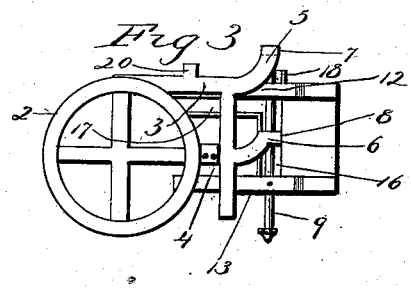
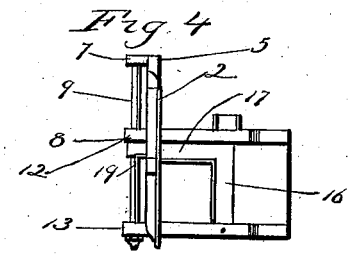

UNITED STATES PATENT OFFICE.

JAMES M. NOLAN, OF NEW HAVEN, CONNECTICUT, ASSIGNOR OF TWO-THIRDS TO WILLIAM H. WILSON AND CHARLES RASMUSSEN, OF NEW HAVEN, CONNECTICUT.

FOLDING-SEAT FRAME FOR AUTOMOBILES.

No. 873,453.     Specification of Letters Patent.     Patented Dec. 10, 1907.

Application filed August 23, 1907. Serial No. 389,848.

*To all whom it may concern:*

Be it known that I, JAMES M. NOLAN, a citizen of the United States, residing at New Haven, in the county of New Haven and State of Connecticut, have invented a new and useful Improvement in Folding-Seat Frames for Automobiles; and I do hereby declare the following, when taken in connection with the accompanying drawings and the letters of reference marked thereon, to be a full, clear, and exact description of the same, and which said drawings constitute part of this specification, and represent, in—

Figure 1 a sectional view of a portion of an automobile body looking toward the rear and showing one of my improved folding seat frames in the folded position, and the other in open position. Fig. 2 a top or plan view of a folding seat frame in the open position. Fig. 3 a plan view of the same in an intermediate position and preparatory to turning the seat upward. Fig. 4 a top or plan view with the spider turned upward.

This invention relates to an improvement in folding seat frames for automobiles, and particularly to frames for seats arranged with the tonneau forward of the permanent back seat. In the more general construction of automobiles the tonneau is entered by doors at the sides, and it is desirable to locate these folding seats in line with said doors, hence the seats obstruct entrance to or exit from the tonneau.

The object of this invention is the arrangement of a folding seat frame which when not in use, may be folded and moved rearward out of line with the door; and the invention consists in the construction hereinafter described and particularly recited in the claims.

In illustrating my invention, I have omitted the seats proper, but it will be understood that they consist of the usual seat, back and arms which may be folded together, and are swivelly mounted upon spiders 2 which are made for the right and left sides of a vehicle. These spiders are formed with inwardly extending arms 3 and 4 the respective arms having rearwardly turned ends 5 and 6 and downwardly projecting fingers 7 and 8 which are connected by a rod 9. The brackets 10 are secured to the side rails of the vehicle in rear of the door and are supported by braces 11. These brackets comprise two outwardly extending guides 12 and 13 formed with long, horizontal clearance slots 14 and 15 for the rod 9 which is free to slide back and forth therein. The brackets also comprise a transverse groove 16 and a longitudinal groove 17 intersecting the groove 16 in which grooves the finger 8 of the arm 4 is adapted to ride. The bracket is also formed with a lug 18 forming a seat for the finger 7 of the arm 3.

Carried by the arm 4 is a U-shaped clip 19 adapted to embrace the guide 13, while the arm 3 has an outwardly extending lug 20 to rest upon the guide 12. When in use and as shown in Fig. 2 of the drawings, the lug 20 supports the arm 3, while the guide 13 supports the spider arm 4 and they may be locked in this position by a pin 21 passing through the guide 13 and rod 9. When it is desired to fold the seat the pin 21 is removed and the spider moved rearward, the finger 8 riding in the groove 16 until it strikes the guide 12, when the spider can be moved outward, the finger 8 riding in the groove 17, whereby the spider is guided in horizontal movement. As the spider is moved outward it may be turned upward, the outward movement of the spider providing room between it and the side of the vehicle for the seat proper, with its folded back and arms, and when thus folded the seat is in rear of the doors. When again required for use the spider is turned down and moved forward and inward toward the side of the vehicle and the arms and spider again interlocked with the grooves in the brackets, as before described.

I claim:—

1. A folding seat frame for automobiles consisting of a bracket having outwardly extending slotted guides and transverse and longitudinal grooves, a seat spider having inwardly extending arms and fingers, a rod connecting said fingers and extending through the slots in the frame, one of said fingers adapted to ride in said grooves, substantially as described.

2. The herein described folding seat frame for automobiles comprising a bracket having outwardly extending slotted guides, a transverse groove and a longitudinal groove intersecting the same, and a spider having inwardly extending arms terminating in fingers, a rod connecting said fingers and extending through the slots in the guides, a clip on one arm adapted to engage with one of said guides and a lug on the other arm adapted to rest upon the other guide, substantially as described.

In testimony whereof, I have signed this specification in the presence of two subscribing witnesses.

JAMES M. NOLAN.

Witnesses:
FREDERIC C. EARLE,
CLARA L. WEED.